US007475012B2

(12) United States Patent
Garner et al.

(10) Patent No.: US 7,475,012 B2
(45) Date of Patent: Jan. 6, 2009

(54) SIGNAL DETECTION USING MAXIMUM A POSTERIORI LIKELIHOOD AND NOISE SPECTRAL DIFFERENCE

(75) Inventors: Philip Garner, Tokyo (JP); Toshiaki Fukada, Kanagawa (JP); Yasuhiro Komori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 666 days.

(21) Appl. No.: 11/007,245

(22) Filed: Dec. 9, 2004

(65) Prior Publication Data

US 2005/0131689 A1 Jun. 16, 2005

(30) Foreign Application Priority Data

Dec. 16, 2003 (JP) ............................ 2003-418646

(51) Int. Cl.
*G10L 11/02* (2006.01)
*G10L 15/20* (2006.01)

(52) U.S. Cl. ........................ 704/233; 704/236; 704/240

(58) Field of Classification Search ................. 704/233, 704/226, 240, 248, 253
See application file for complete search history.

(56) References Cited

U.S. PATENT DOCUMENTS 5,432,859 A 7/1995 Yang et al.
5,692,104 A * 11/1997 Chow et al. ................. 704/253
5,749,067 A 5/1998 Barrett
5,963,901 A * 10/1999 Vahatalo et al. ............. 704/233
6,061,647 A 5/2000 Barrett
6,289,309 B1 * 9/2001 deVries ...................... 704/233
6,556,967 B1 * 4/2003 Nelson et al. ............... 704/233
6,615,170 B1 * 9/2003 Liu et al. .................... 704/233
6,678,656 B2 * 1/2004 Macho et al. ............... 704/233
6,993,481 B2 * 1/2006 Skoglund et al. ............ 704/233
2002/0087307 A1 * 7/2002 Lee et al. .................... 704/233
2002/0116187 A1 * 8/2002 Erten ......................... 704/233
2002/0173953 A1 * 11/2002 Frey et al. ................... 704/226

OTHER PUBLICATIONS

Cohen et al. (Noise Estimation by Minima Controlled Recursive Averaging for Robust Speech Enhancement. IEEE Signal Processing Letters, vol. 9. No. 1, Jan. 2002).*
Jin Yang, "Frequency domain noise suppression approaches in mobile telephone systems," Proceedings of the IEEE International Conference on Acoustics, Speech and Signal Processing, vol. II, pp. 363-366, 1993.
Jongseo Sohn and Wonyong Sung, "A Voice Activity Detector Employing Soft Decision Based Noise Spectrum Adaption," Proceedings of the IEEE International Conference on Acoustics, Speech and Signal Processing, pp. 365-368, May 1998.

* cited by examiner

*Primary Examiner*—Talivaldis Ivars Smits
*Assistant Examiner*—Jesse S Pullias
(74) *Attorney, Agent, or Firm*—Fitzpatrick, Cella, Harper & Scinto

(57) ABSTRACT

Robust signal detection against various types of background noise is implemented. According to a signal detection apparatus, the feature amount of an input signal sequence and the feature amount of a noise component contained in the signal sequence are extracted. After that, the first likelihood indicating probability that the signal sequence is detected and the second likelihood indicating probability that the noise component is detected are calculated on the basis of a predetermined signal-to-noise ratio and the extracted feature amount of the signal sequence. Additionally, a likelihood ratio indicating the ratio between the first likelihood and the second likelihood is calculated. Detection of the signal sequence is determined on the basis of the likelihood ratio.

2 Claims, 8 Drawing Sheets

SIGNAL DETECTION USING MAXIMUM A POSTERIORI LIKELIHOOD AND NOISE SPECTRAL DIFFERENCE

FIELD OF THE INVENTION

The present invention relates to an apparatus and method for detecting a signal such as an acoustic signal.

BACKGROUND OF THE INVENTION

In the field of, e.g., speech processing, a technique for detecting speech periods is often required. Detection of speech periods is generally referred to as VAD (Voice Activity Detection) and is also referred to as speech activity detection or speech endpointing.

Typical cases that require VAD include the following two cases.

The first case is a speech communication system. FIG. 1 shows an example of a speech signal transmission/reception procedure in the speech communication system. Basically, a front-end processing unit 11 performs predetermined front-end processing for a speech signal input on the transmitting side, and an encoder 13 encodes the processed signal. After that, the encoded speech is sent to the receiving side through a communication line 15. On the receiving side, a decoder 16 decodes the encoded speech and outputs speech. As described above, a speech signal is sent to another place through the communication line 15. In this case, the communication line 15 has some limitations. The limitations result from, e.g., a heavy usage charge and small transmission capacity. A VAD 12 is used to cope with such limitations. The use of the VAD 12 makes it possible to give an instruction to suspend communication while the user does not utter. As a result, a usage charge can be reduced or another user can utilize the communication line during the suspension. Although not always necessary, front-end processing units to be provided on the preceding stages of the VAD 12 and encoder 13 can be integrated into the front-end processing unit 11 common to the VAD 12 and encoder 13, as shown in FIG. 1. With the VAD 12, the encoder 13 itself need not distinguish between speech pauses and long periods of silence.

The second case is an Automatic Speech Recognition (ASR) system. FIG. 2 shows a processing example of an ASR system including a VAD. In FIG. 2, a VAD 22 prevents a speech recognition process in an ASR unit 24 from recognizing background noise as speech. In other words, the VAD 22 has a function of preventing an error of converting noise into a word. Additionally, the VAD 22 makes it possible to more skillfully manage the throughput of the entire system in a general ASR system that utilizes many computer resources. For example, control of a portable device by speech is allowed. More specifically, the VAD distinguishes between a period during which the user does not utter and that during which the user issues a command. As a result, the apparatus can so control as to concentrate on other functions while speech recognition is not in progress and concentrate on ASR while the user utters. In this example as well, a front-end processing unit 21 on the input side of the VAD 22 and ASR unit 24 can be shared by the VAD 22 and ASR unit, as shown in FIG. 2. In this example, a speech endpoint detection module 23 uses a VAD signal to distinguish between periods between starts and ends of utterances and pauses between words. This is because an ASR unit 24 must accept as speech the entire utterance without any gaps.

To detect a speech period at high precision, background noise needs to be taken into consideration. Since background noise varies every moment, the variation must be tracked and reflected in the VAD metric. It is, however, difficult to implement high-precision tracking. There have conventionally been made various proposals in such terms. Conventional examples will be described briefly below.

Typical examples of conventional VAD methods include one using a time-domain analysis result such as energy or zero-crossing count. However, a parameter obtained from a time-domain process is susceptible to noise. To cope with this, U.S. Pat. No. 5,692,104 discloses a method of detecting a speech period at high precision on the basis of a frequency-domain analysis.

U.S. Pat. No. 5,432,859 and Jin Yang, "Frequency domain noise suppression approaches in mobile telephone systems", Proceeding of the IEEE International Conference on Acoustics, Speech and Signal Processing, volume II, pp. 363-366, 1993 is related to a technique for detecting speech while suppressing noise. These references describe that a signal-to-noise ratio (SNR) is a useful VAD metric.

U.S. Pat. Nos. 5,749,067 and 6,061,647 disclose a VAD technique which continuously updates a noise estimate. A noise estimation unit is controlled by the second auxiliary VAD.

U.S. Pat. No. 5,963,901 discloses a VAD technique using a sub-decision for each spectral band.

Jongseo Sohn and Wonyong Sung, "A Voice Activity Detector employing soft decision based noise spectrum adaptation", Proceedings of the IEEE international Conference on Acoustics, Speech and Signal Processing, pp. 365-368, May 1998 discloses a VAD technique based on a likelihood ratio. In the technique, only speech and noise parameters are used.

The above-mentioned prior-art techniques have the following problems.

(Problem 1)

In the prior-art techniques as described above, there is no method of designating a signal-to-noise ratio between a typical speech signal and background noise. For this reason, certain types of noise may be classified as speech by mistake. One characteristic feature of the present invention is to provide a means for setting a signal-to-noise ratio in advance and thereby execute formulation by MAP (maximum a-posteriori method). This makes it possible to reduce the speech detection sensitivity for certain types of noise.

(Problem 2)

The typical prior-art techniques make no assumption about the spectrum shape of a speech signal. For this reason, loud noise may be classified as speech by mistake. Another characteristic feature of the present invention lies in that a difference spectral metric is used to distinguish between certain types of noise (whose frequency shape is flat) and speech (whose frequency shape is not flat).

(Problem 3)

In the prior-art techniques, only periods during which background noise appears are used to update noise tracking. In such periods, the minimum tracking ratio must be used to track only low-frequency variations at high precision. Since no explicit minimum value is given in the prior art, the MAP method may track high-frequency variations as well. Still another characteristic feature of the present invention is a noise tracking method with a minimum tracking ratio.

SUMMARY OF THE INVENTION

As described above, the present invention can provide a signal detection technique that is robust against various types of background noise.

The above-mentioned problems are solved by a signal detection apparatus and method and noise tracking apparatus and method. According to one aspect of the present invention, there is provided a signal detection apparatus comprising first extraction means for extracting a feature amount of an input signal sequence, second extraction means for extracting a feature amount of a noise component contained in the signal sequence, first likelihood calculation means for calculating a first likelihood indicating probability that the signal sequence is detected, on the basis of a predetermined signal-to-noise ratio and the feature amount of the signal sequence extracted by the first extraction means, second likelihood calculation means for calculating a second likelihood indicating probability that the noise component is detected, on the basis of the feature amount of the noise component extracted by the second extraction means, likelihood comparison means for comparing the first likelihood with the second likelihood, and determination means for determining detection of the signal sequence on the basis of a comparison result obtained from the likelihood comparison means.

According to another aspect of the present invention, there is provided a signal detection apparatus comprising first extraction means for extracting a feature amount of an input signal sequence, second extraction means for extracting a feature amount of a noise component contained in the signal sequence, first likelihood calculation means for calculating a first likelihood indicating probability that the signal sequence is detected, on the basis of the feature amount of the signal sequence extracted by the first extraction means, second likelihood calculation means for calculating a second likelihood indicating probability that the noise component is detected, on the basis of the feature amount of the noise component extracted by the second extraction means, filter means for performing low-pass filtering for the first likelihood and second likelihood in a frequency direction, likelihood comparison means for comparing the first likelihood and second likelihood having passed the filter means, and determination means for determining detection of the signal sequence on the basis of a comparison result obtained from the likelihood comparison means.

According to still another aspect of the present invention, there is provided a signal detection method comprising steps of (a) extracting a feature amount of an input signal sequence, (b) extracting a feature amount of a noise component contained in the signal sequence, (c) calculating a first likelihood indicating probability that the signal sequence is detected, on the basis of a predetermined signal-to-noise ratio and the feature amount of the signal sequence extracted in the step (a), (d) calculating a second likelihood indicating probability that the noise component is detected, on the basis of the feature amount of the noise component extracted in the step (b), (e) comparing the first likelihood with the second likelihood, and (f) determining detection of the signal sequence on the basis of a comparison result obtained in the step (e).

According to still another aspect of the present invention, there is provided a signal detection method comprising steps of (a) extracting a feature amount of an input signal sequence, (b) extracting a feature amount of a noise component contained in the signal sequence, (c) calculating a first likelihood indicating probability that the signal sequence is detected, on the basis of the feature amount of the signal sequence extracted in the step (a), (d) calculating a second likelihood indicating probability that the noise component is detected, on the basis of the feature amount of the noise component extracted in the step (b), (e) performing low-pass filtering for the first likelihood and second likelihood in a frequency direction, (f) comparing the first likelihood and second likelihood having undergone the low-pass filtering in the step (e), and (g) determining detection of the signal sequence on the basis of a comparison result obtained in the step (f).

According to still another aspect of the present invention, there is provided a noise tracking apparatus comprising input means for inputting a feature amount of a signal sequence and a feature amount of a noise component contained in the signal sequence, likelihood comparison means for calculating a first likelihood indicating probability that the signal sequence is detected, on the basis of the feature amount of the signal sequence, calculating a second likelihood indicating probability that the noise component is detected, on the basis of the feature amount of the noise component, and comparing the first likelihood with the second likelihood, and update means for calculating the feature amount of the noise component on the basis of a feature amount of a previous noise component, a comparison result obtained from the likelihood comparison means, and a minimum update value, and updating the feature amount using a calculation result.

According to still another aspect of the present invention, there is provided a noise tracking method comprising steps of (a) inputting a feature amount of a signal sequence and a feature amount of a noise component contained in the signal sequence, (b) calculating a first likelihood indicating probability that the signal sequence is detected, on the basis of the feature amount of the signal sequence, calculating a second likelihood indicating probability that the noise component is detected, on the basis of the feature amount of the noise component, and comparing the first likelihood and the second likelihood, and (c) calculating the feature amount of the noise component on the basis of a feature amount of a previous noise component and a comparison result obtained in the step (b), and updating the feature amount using a calculation result.

Other and further objects, features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In this embodiment, the terms "noise", "silence" and "non-speech" are used interchangeably.

In the following explanation, a signal detection process according to the present invention will be described with respect to several formulas. Generally, the vector representation of a signal is indicated in bold type to be distinguished from a scalar value. In the following description, however, the vector representation is not indicated in that manner. When a signal means a vector, a word "vector" is indicated. On the other hand, when it is easy to distinguish a vector from a scalar value, the word may be omitted.

Figure 1:
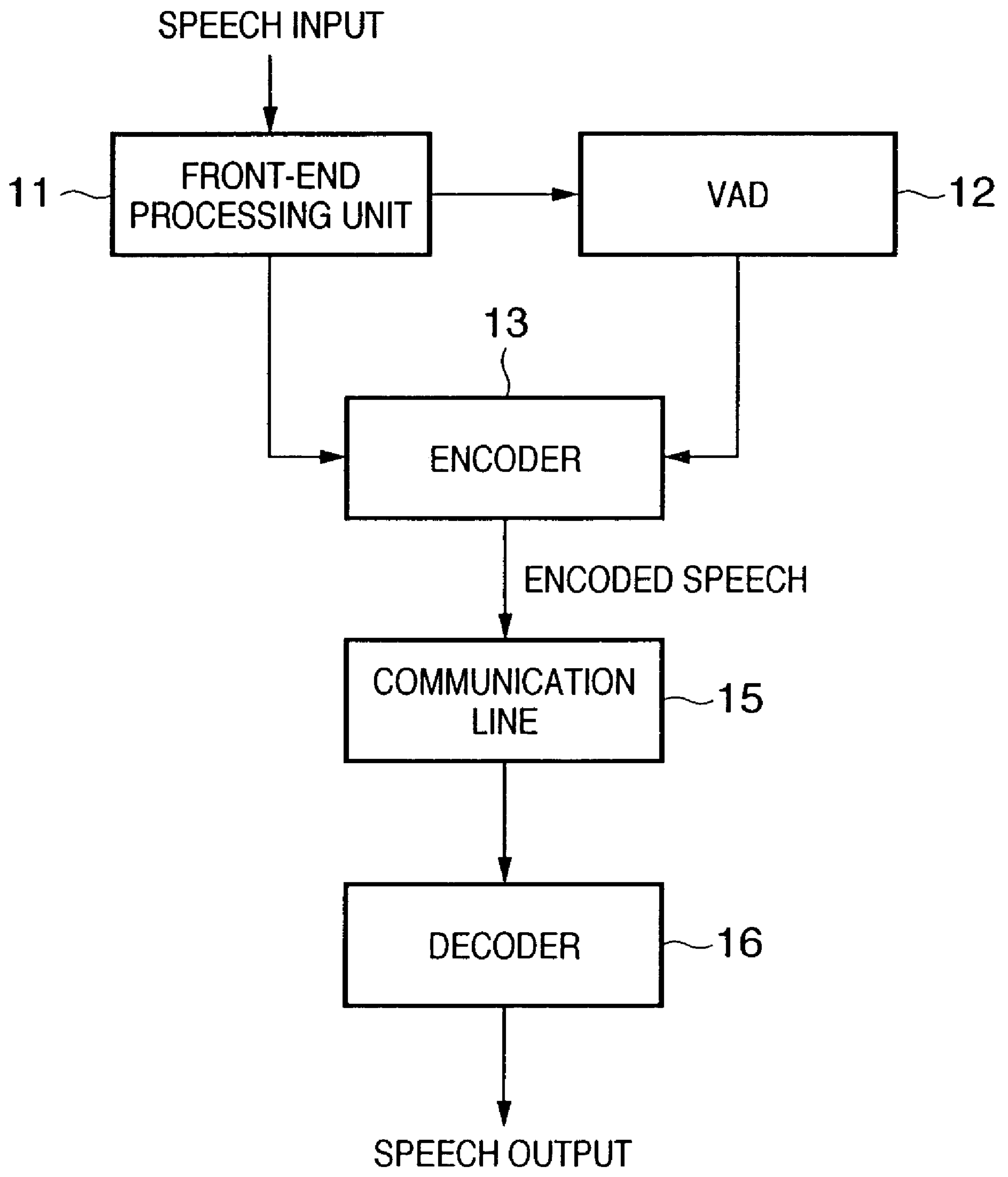
FIG. 1 is a block diagram showing a speech transmission/reception procedure in a speech communication system.
Figure 2:
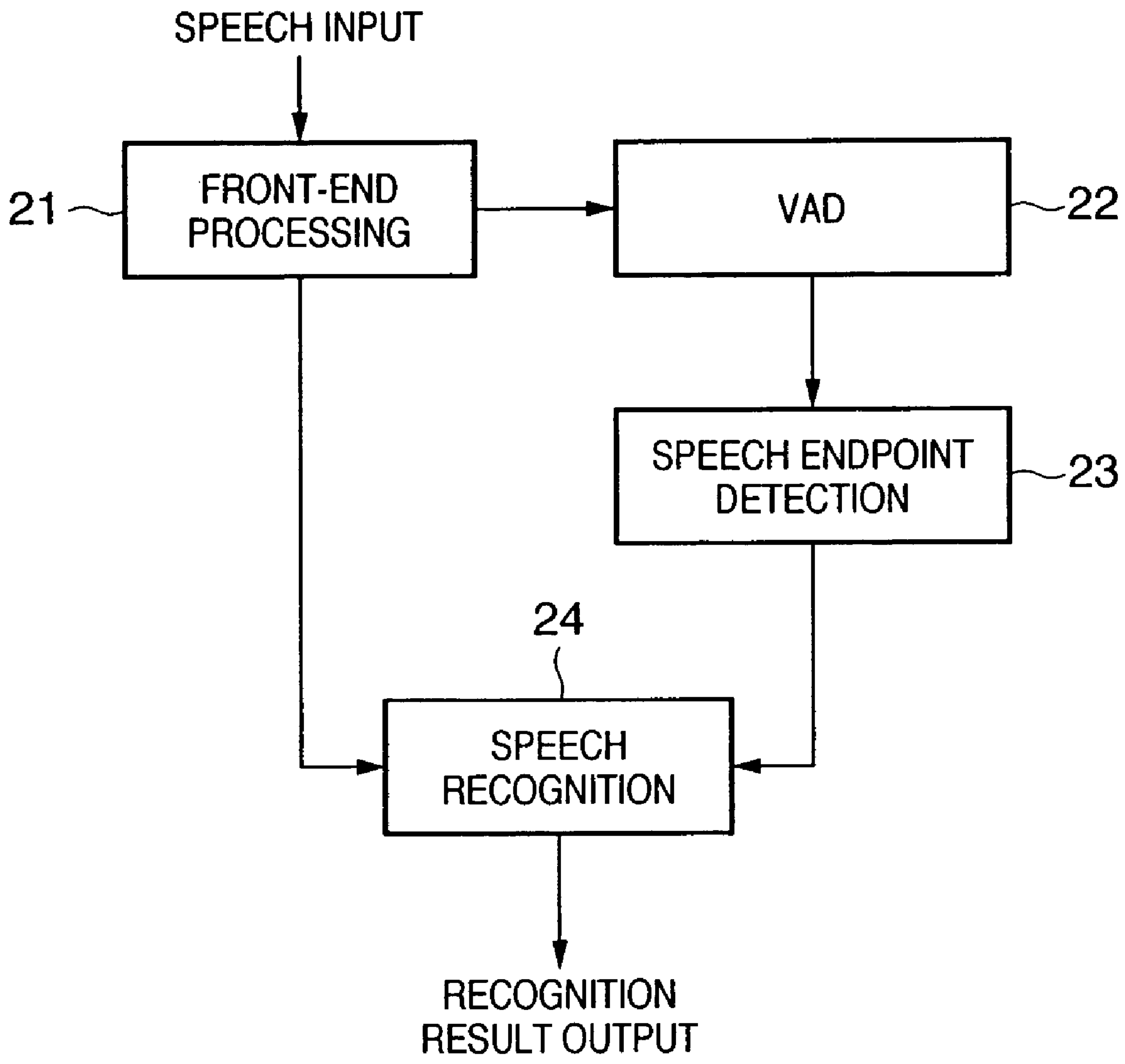
FIG. 2 is a block diagram showing a processing example of a speech recognition system including a VAD.

As an embodiment, a case will be considered wherein VAD according to the present invention is applied to a speech recognition system as shown in FIG. 2. The present invention can also be applied to, e.g., a speech communication system as shown in FIG. 1.

The present invention can be implemented by a general computer system. Although the present invention can also be implemented by dedicated hardware logic, this example is implemented by a computer system.

Figure 3:
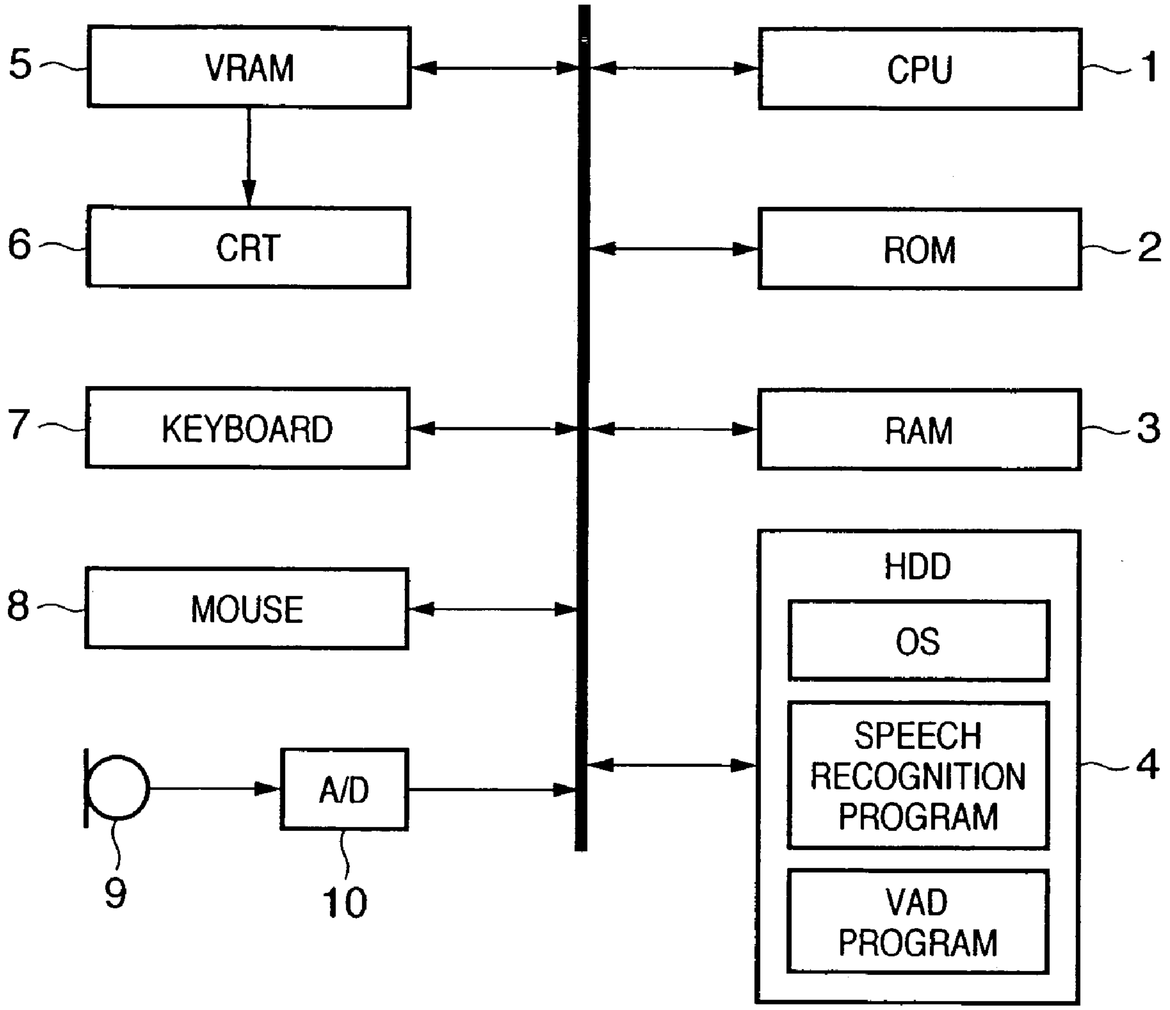
FIG. 3 is a block diagram showing the arrangement of a computer system according to an embodiment.

FIG. 3 is a block diagram showing the arrangement of a computer system according to the embodiment. As shown in FIG. 3, the computer system comprises the following arrangement in addition to a CPU 1, which controls the entire system, a ROM 2, which stores a boot program and the like, and a RAM 3, which functions as a main storage device.

An HDD 4 is a hard disk unit and stores an OS, a speech recognition program, and a VAD program that operates upon being called by the speech recognition program. For example, if the computer system is incorporated in another device, these programs may be stored not in the HDD but in the ROM 2. A VRAM 5 is a memory onto which image data to be displayed is rasterized. By rasterizing image data and the like onto the memory, the image data can be displayed on a CRT 6. Reference numerals 7 and 8 denote a keyboard and mouse, respectively, serving as input devices. Reference numeral 9 denotes a microphone for inputting speech; and 10, an A/D converter that converts a signal from the microphone 9 into a digital signal.

Figure 4:
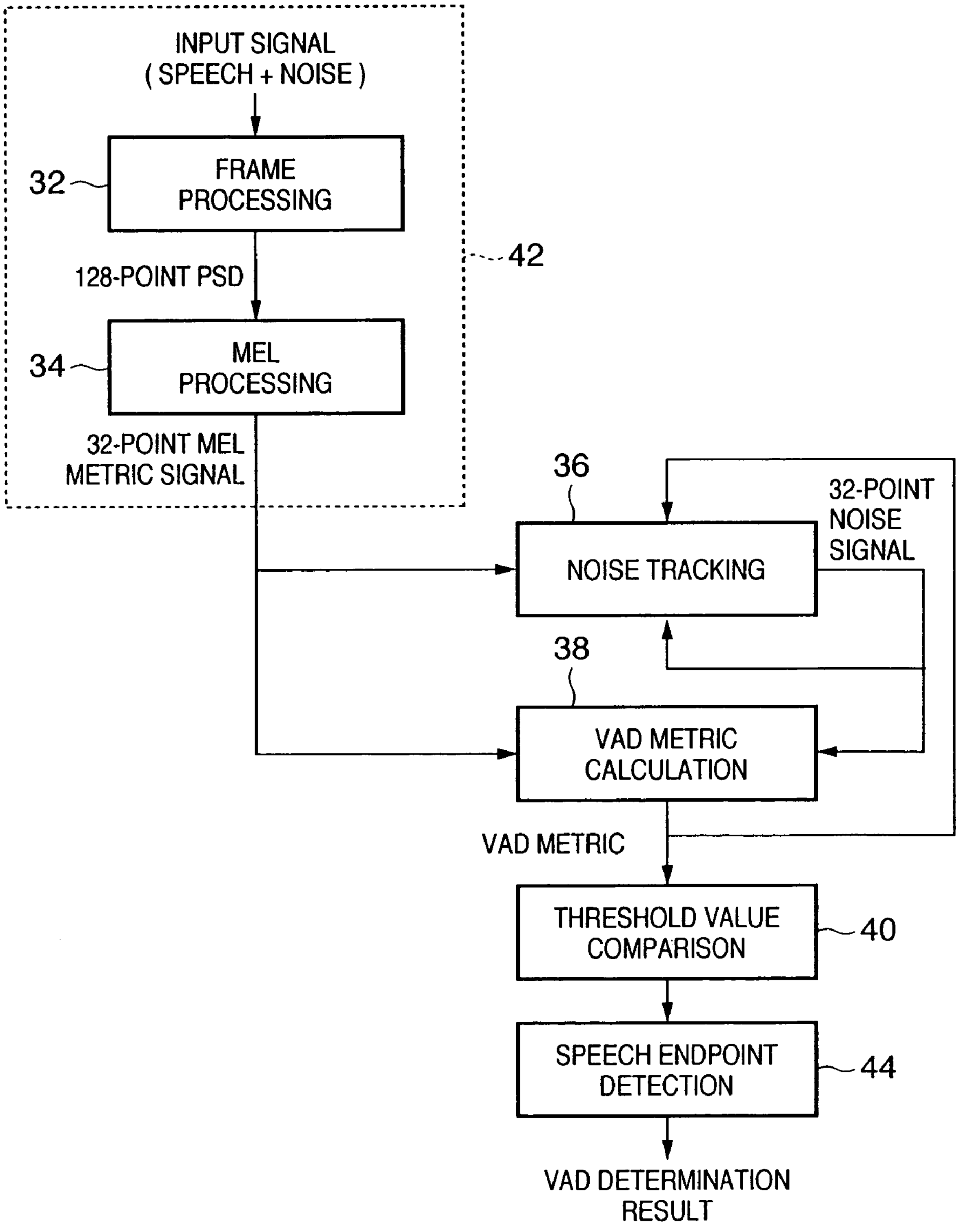
FIG. 4 is a functional block diagram that implements a signal detection process according to the embodiment.

FIG. 4 is a functional block diagram that implements the signal detection process according to the embodiment. Processes of a VAD will be described with reference to FIG. 4.

(Feature Extraction)

An acoustic signal (which can contain speech and background noise) input from the microphone 9 is sampled by the A/D converter 10 at, e.g., 11.025 kHz and is divided by a frame processing module 32 into frames each comprising 256 samples. Each frame is generated, e.g., every 110 samples. That is, adjacent frames overlap with each other. In this arrangement, 100 frames correspond to about 1 second. Each frame undergoes a Hamming window process and then a Hartley transform process. The sum of squares of two output results of the Hartley transform process at a single frequency is calculated, thereby forming a periodogram. A periodogram is generally known as a PSD (Power Spectral Density). For a frame of 256 samples, the PSD has 129 bins.

Each PSD is reduced in size (e.g., to 32 points) by a mel processing module 34 using a mel-band value (bin). The mel processing module 34 converts an equidistantly and linearly transformed frequency characteristic into an auditory characteristic metric (mel metric) space. Since the mel filters overlap in the frequency domain, the values of respective points having undergone the mel processing have high correlations. In this embodiment, 32 mel metric signals thus generated are used as feature amounts for VAD. In the field of speech recognition, a mel representation is generally used. The representation is typically used in a process of executing logarithmic transformation and then cosine transformation for a mel spectrum thus transforming the mel spectrum into a mel cepstrum. However, in this VAD process, a value having directly undergone the mel processing is used. As described above, in this embodiment, a mel metric signal is used as a feature amount. A feature amount based on another metric may be used.

(Noise Tracking)

A mel metric signal is input to a noise tracking module 36 and VAD metric calculation module 38. The noise tracking module 36 tracks background noise that gradually varies in the input mel metric signal. This tracking uses the VAD metrics previously calculated by the VAD metric calculation module 38.

A VAD metric will be described later. The present invention uses a likelihood ratio as a VAD metric. A likelihood ratio $L_f$ in a frame f is defined by, e.g., the following equation:

$$L_f = \frac{p(s_f^2 \mid \text{speech})}{p(s_f^2 \mid \text{noise})} \quad (1)$$

where $s^2_f$ represents a vector comprising a 32-dimensional feature $\{s_1^2, s_2^2, \ldots s_s^2\}$ measured in the frame f, the numerator represents a likelihood which indicates probability that the frame f is detected as speech, and the denominator represents a likelihood which indicates probability that the frame f is detected as noise. All expressions described in this specification can also directly use a vector $s_f = \{s_1, s_2, \ldots s_s\}$ of a spectral magnitude as a spectral metric. In this example, the spectral metric is represented as-a square, i.e., a feature vector calculated from a PSD, unless otherwise specified.

Noise tracking by the noise tracking module 36 is typically represented by the -following equation in the single pole filter form:

$$\mu_f = (1-\rho_\mu)s_f^2 + \rho_\mu \mu_{f-1} \quad (2)$$

where $\mu_f$ represents a 32-dimensional noise estimation vector in the frame f, and $\rho_\mu$ represents the pole of a noise update filter component and is the minimum update value.

Noise tracking according to this embodiment is defined by the following equation:

$$\mu_f = \frac{1-\rho_\mu}{1+L_f} s_f^2 + \frac{\rho_\mu + L_f}{1+L_f} \mu_{f-1} \quad (3)$$

If a spectral magnitude s is used instead of a spectral power $s^2$, the likelihood ratio is represented by the following equation:

$$\mu_f = \frac{1-\rho_\mu}{1+L_f} s_f + \frac{\rho_\mu + L_f}{1+L_f} \mu_{f-1} \tag{4}$$

As described above, $L_f$ represents the likelihood ratio in the frame f. When $L_f$ approaches 0, noise tracking is represented by equation (2) in the single pole filter form. In this case, the pole functions as the minimum tracking ratio. On the other hand, when the value of $L_f$ is increased (to more than 1), noise tracking approaches the following equation:

$$\mu_f = \mu_{f-1} \tag{5}$$

As described above, noise component extraction according to this embodiment includes a process of tracking noise on the basis of the feature amount of a noise component in a previous frame and the likelihood ratio in the previous frame.

(Calculation of VAD Metric)

As described above, the present invention uses the likelihood ratio represented by equation (1). Three likelihood ratio calculation methods will be described below.

(1) Maximum Likelihood Method (ML)

Figure 5:
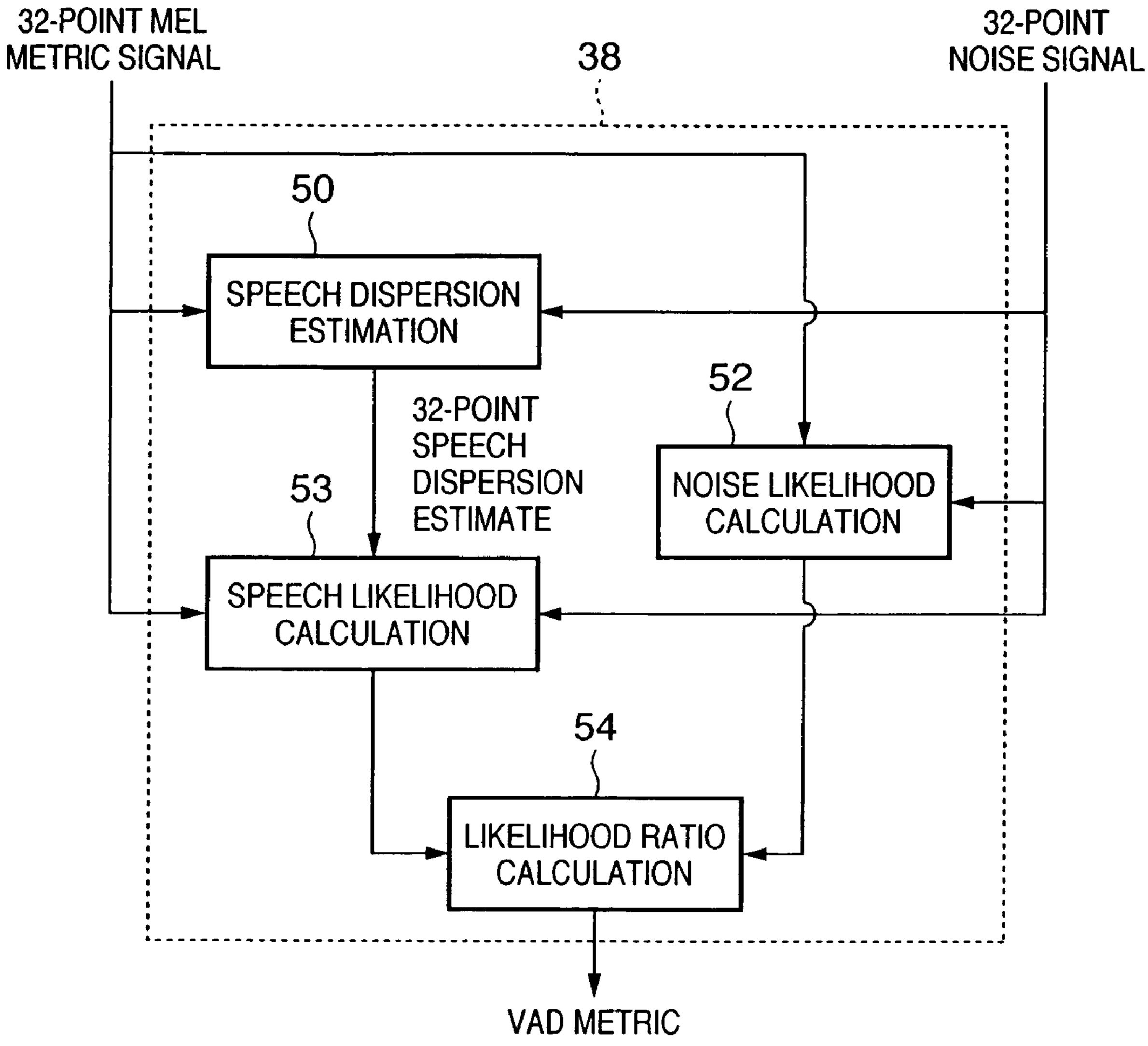
FIG. 5 is a block diagram showing a VAD metric calculation procedure using a maximum likelihood method.

The maximum likelihood method (ML) is represented by, e.g., the equations below. The method is also disclosed in Jongseo Sohn et al., "A Voice Activity Detector employing soft decision based noise spectrum adaptation" (Proceedings of the IEEE International Conference on Acoustics, Speech and Signal Processing, pp. 365-368, May 1998).

$$p(s_f^2 \mid \text{speech}) = \prod_{k=1}^{S} \frac{1}{\pi(\lambda_k + \mu_k)} \exp\left(-\frac{s_k^2}{\lambda_k + \mu_k}\right) \tag{6}$$

$$p(s_f^2 \mid \text{noise}) = \prod_{k=1}^{S} \frac{1}{\pi\mu_k} \exp\left(\frac{-s_k^2}{\mu_k}\right) \text{ Therefore,} \tag{7}$$

$$L_f = \prod_{k=1}^{S} \frac{\mu_k}{\lambda_k + \mu_k} \exp\left(\frac{\lambda_k}{\lambda_k + \mu_k} \cdot \frac{s_k^2}{\mu_k}\right) \tag{8}$$

where k represents an index of the feature vector, S represents the number of features (vector elements) of the feature vector (in this embodiment, 32), $\mu_k$ represents the kth element of the noise estimation vector $\mu_f$ in the frame f, $\lambda_k$ represents the kth element of a vector $\lambda_f$ (to be described later), and $s^2_k$ represents the kth element of the vector $s^2_f$. FIG. 5 shows this calculation procedure.

In VAD metric calculation using the maximum likelihood method, the value $\lambda_k$ of the kth element of the vector $\lambda_f$ needs to be calculated. The vector $\lambda_f$ is an estimate of speech variance in the frame f (standard deviation, if the spectral magnitude s is used instead of the spectral power $s^2$). In FIG. 5, the vector is obtained by speech distribution estimation 50. In this embodiment, the vector $\lambda_f$ is calculated by a spectral subtraction method represented by the following equation (9):

$$\lambda_f = \max(s_f^2 - \alpha\mu_f, \beta s_f^2) \tag{9}$$

where α and β are appropriate fixed values. In this embodiment, for example, α and β are 1.1 and 0.3, respectively.

(2) Maximum A-Posteriori Method (MAP)

Figure 6:
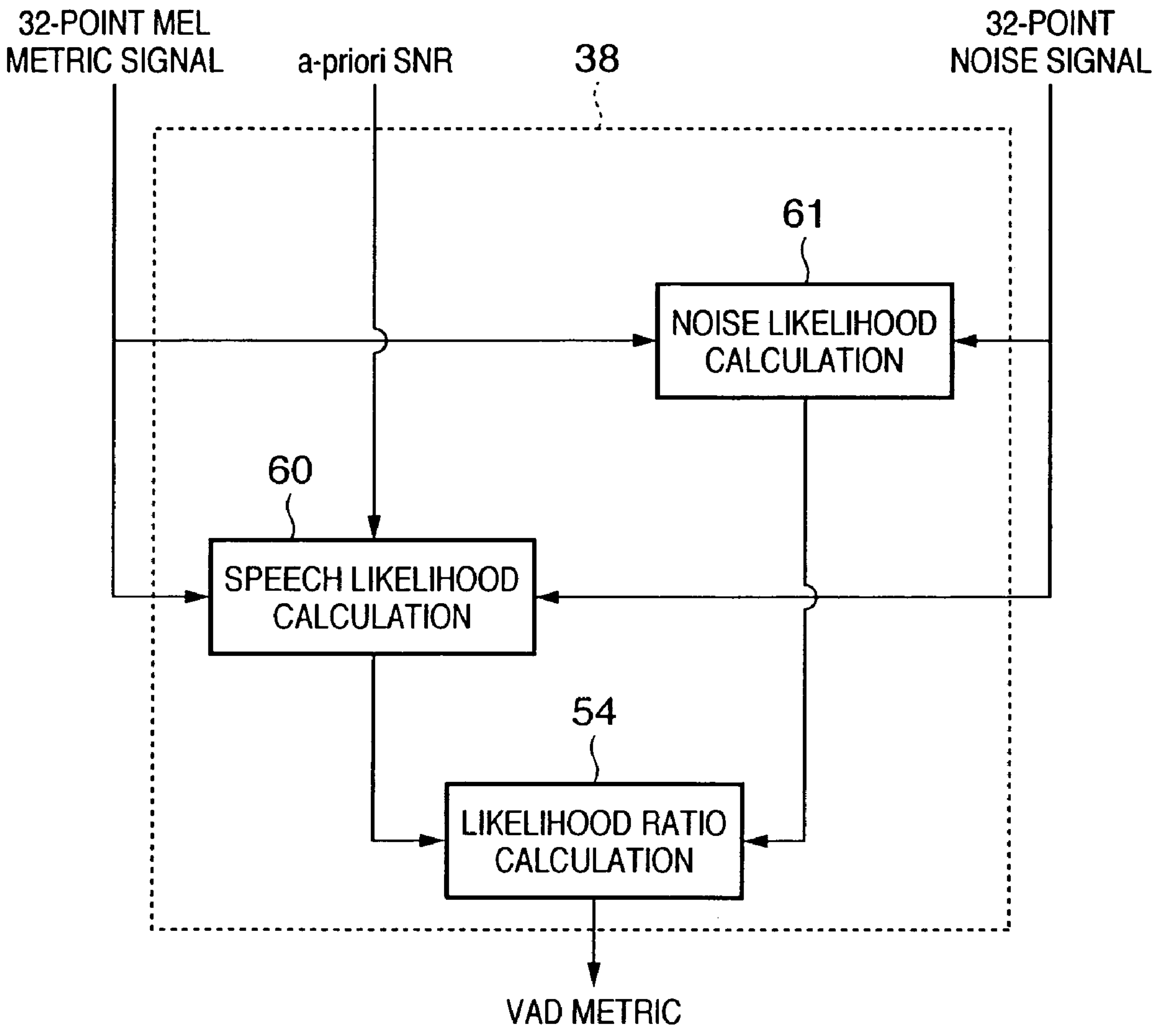
FIG. 6 is a block diagram showing a VAD metric calculation procedure using a maximum a-posteriori method.

A calculation method using the maximum likelihood method (1) requires calculation of the vector $\lambda_f$. This calculation requires a spectral subtraction method or a process such as "decision directed" estimation. For this reason, the maximum a-posteriori method (MAP) can be used instead of the maximum likelihood method. A method using MAP can advantageously avoid calculation of the vector $\lambda_f$. FIG. 6 shows this calculation procedure. In this case, the noise likelihood calculation denoted by reference numeral 61 is the same as the case of the maximum likelihood method described above (noise likelihood calculation denoted by reference numeral 52 in FIG. 5). However, the speech likelihood calculation in FIG. 6 is different from that in the maximum likelihood method and is executed in accordance with the following equation (10):

$$p(s_f^2 \mid \text{speech}) = \prod_{k=1}^{S} \frac{1}{\pi\gamma(0,\omega)\mu_k\left(\frac{s_k^2}{\mu_k} + \omega\right)} \left[1 - \exp\left(-\frac{s_k^2}{\mu_k} - \omega\right)\right] \tag{10}$$

where ω represents a signal-to-noise ratio (SNR) that is experimentally determined in advance, and γ(*,*) represents the lower incomplete gamma function. As a result, the likelihood ratio is represented by the following equation (11):

$$L_f = \prod_{k=1}^{S} \frac{1}{e^{\omega}\gamma(0,\omega)\left(\frac{s_k^2}{\mu_k} + \omega\right)} \left[\exp\left(\frac{s_k^2}{\mu_k} + \omega\right) - 1\right] \tag{11}$$

In this embodiment, ω is set to 100. The likelihood ratio is represented by the following equation (12) if the spectral magnitude s is used instead of the spectral power $s^2$:

$$L_f = \prod_{k=1}^{S} \frac{1}{e^{\omega}\gamma(0,\omega)\left(\frac{s_k}{\mu_k} + \omega\right)} \left[\exp\left(\frac{s_k}{\mu_k} + \omega\right) - 1\right] \tag{12}$$

(3) Differential Feature ML Method

The above-mentioned two calculation methods are based on a method that directly uses a feature amount. As another alternative, there is available a method of performing low-pass filtering before VAD metric calculation in the feature domain (not in the time domain). A case wherein the feature amount is a spectrum has the following two advantages.

(a) An offset (DC) is eliminated. In other words, noise components over a wide range of frequencies are eliminated. This is substantially effective against short-time broadband noise (impulse) such as sound caused by clapping hands or sound caused by a collision between solid objects. These sounds are too fast to be tracked by the noise tracker.

(b) Correlation generated by mel processing can also be eliminated.

A typical low-pass filter is represented by the following recursive expression:

$$x'_k = x_k - x_{k+1}$$

In the case of a spectrum, $x_k = s^2_k$.

In this embodiment, decimation is executed in, e.g., the manner below. A normal filter generates a vector x'.

$$x'_1 = x_1 - x_2,$$

$x'_2=x_2-x_3,$

...

$x'_{S-1}=x_{S-1}-x_S$

As a result, each vector consists of (S-1) elements. A decimation filter in this embodiment uses alternate values. Each vector consists of (S/2) elements.

$x'_1=x_1-x_2,$ $x'_2=x_3-x_4,$

...

$x'_{S/2}=x_{S-1}-x_S$

Figure 7:
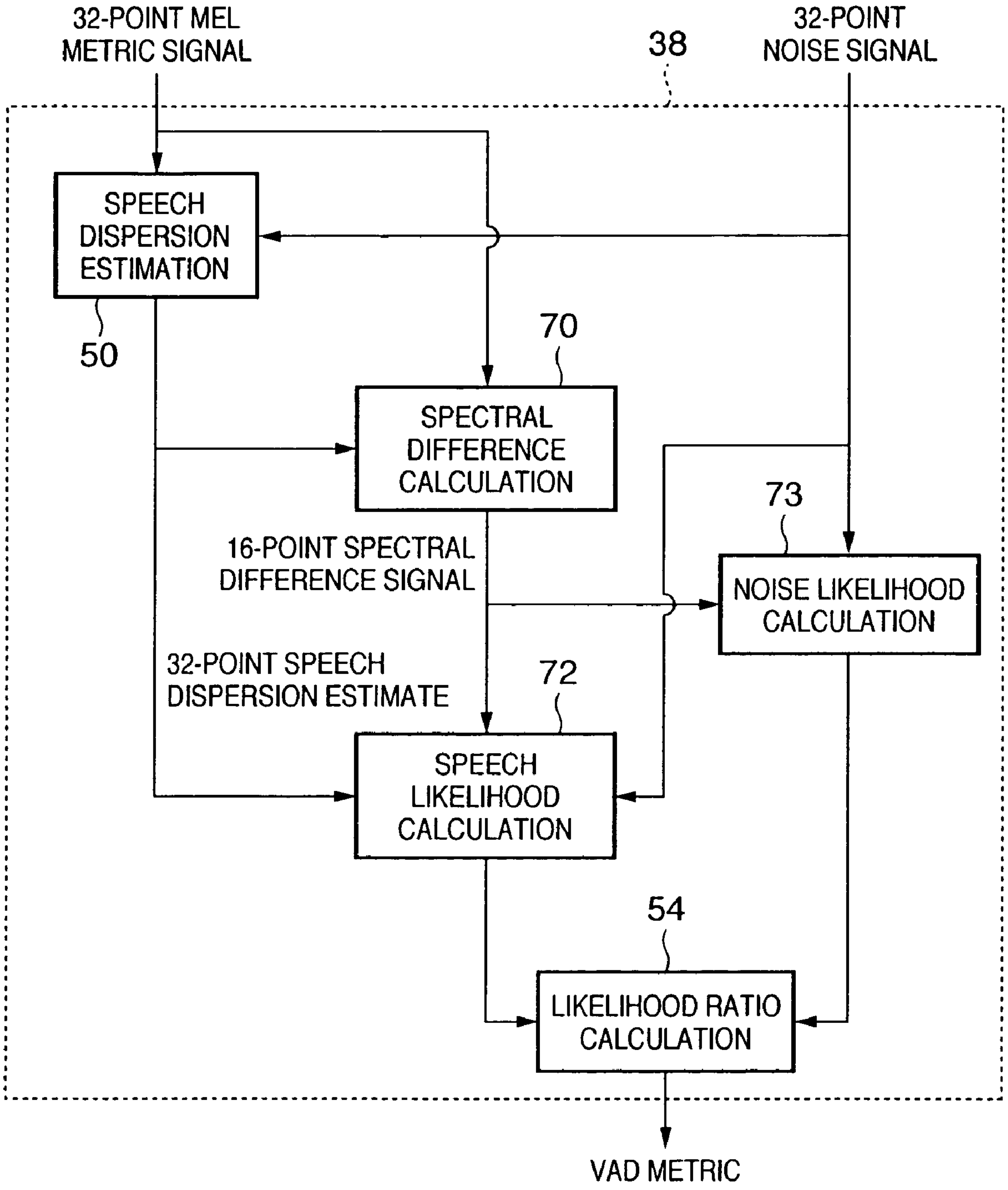
FIG. 7 is a block diagram showing a VAD metric calculation procedure using a differential feature ML method.

FIG. 7 shows this calculation procedure. In this case, the ratio between a speech likelihood calculated in speech likelihood calculation 72 and a noise likelihood calculated in noise likelihood calculation 73 (likelihood ratio) depends on which spectral element is larger. More specifically, if $s^2_{2k-1}>s^2_{2k}$ holds, a speech likelihood $P(s^2_f|\text{speech})$ and noise likelihood $P(s^2_f|\text{noise})$ are respectively represented by the following equations (13) and (14):

$$p(s_f^2 \mid \text{speech}) = \prod_{k=1}^{S/2} \frac{1}{\lambda_{2k}+\mu_{2k}+\lambda_{2k-1}+\mu_{2k-1}} \exp\left(-\frac{s_{2k-1}^2 - s_{2k}^2}{\lambda_{2k-1}+\mu_{2k-1}+\lambda_{2k}+\mu_{2k}}\right) \tag{13}$$

$$p(s_f^2 \mid \text{noise}) = \prod_{k=1}^{S/2} \frac{1}{\mu_{2k}+\mu_{2k-1}} \exp\left(-\frac{s_{2k-1}^2 - s_{2k}^2}{\mu_{2k-1}+\mu_{2k-1}}\right) \tag{14}$$

On the other hand, if $s^2_{2k}>s^2_{2k-1}$ holds, the speech likelihood $P(s^2_f|\text{speech})$ and noise likelihood $P(s^2_f|\text{noise})$ are respectively represented by the following equations (15) and (16):

$$p(s_f^2 \mid \text{speech}) = \prod_{k=1}^{S/2} \frac{1}{\lambda_{2k}+\mu_{2k}+\lambda_{2k-1}+\mu_{2k-1}} \exp\left(-\frac{s_{2k}^2 - s_{2k-1}^2}{\lambda_{2k}+\mu_{2k}+\lambda_{2k-1}+\mu_{2k-1}}\right) \tag{15}$$

$$p(s_f^2 \mid \text{noise}) = \prod_{k=1}^{S/2} \frac{1}{\mu_{2k}+\mu_{2k-1}} \exp\left(-\frac{s_{2k}^2 - s_{2k-1}^2}{\mu_{2k}+\mu_{2k-1}}\right) \tag{16}$$

Therefore, the likelihood ratio is represented as follows:

$$L_f = \prod_{k=1}^{S/2} \frac{\mu_{2k}+\mu_{2k-1}}{\lambda_{2k}+\mu_{2k}+\lambda_{2k-1}+\mu_{2k-1}} \exp\left(\frac{\lambda_{2k-1}-\lambda_{2k}}{\lambda_{2k-1}-\lambda_{2k}+\mu_{2k-1}-\mu_{2k}} \cdot \frac{s_{2k-1}^2 - s_{2k}^2}{\mu_{2k-1}-\mu_{2k}}\right), \quad \text{if } s_{2k-1}^2 > s_{2k}^2 \tag{17}$$

-continued $$L_f = \prod_{k=1}^{S/2} \frac{\mu_{2k}+\mu_{2k-1}}{\lambda_{2k}+\mu_{2k}+\lambda_{2k-1}+\mu_{2k-1}} \exp\left(\frac{\lambda_{2k}-\lambda_{2k-1}}{\lambda_{2k}-\lambda_{2k-1}+\mu_{2k}-\mu_{2k-1}} \cdot \frac{s_{2k}^2 - s_{2k-1}^2}{\mu_{2k}-\mu_{2k-1}}\right), \quad \text{if } s_{2k-1}^2 < s_{2k}^2$$

If the spectral magnitude s is used instead of the spectral power $s^2$, the likelihood ratio is represented by the following equations:

$$L_f = \prod_{k=1}^{S/2} \frac{\mu_{2k}+\mu_{2k-1}}{\lambda_{2k}+\mu_{2k}+\lambda_{2k-1}+\mu_{2k-1}} \exp\left(\frac{\lambda_{2k-1}}{\lambda_{2k-1}+\mu_{2k-1}} \cdot \frac{s_{2k-1}-s_{2k}}{\mu_{2k-1}}\right), \text{ if } s_{2k-1} > s_{2k} \tag{18}$$

$$L_f = \prod_{k=1}^{S/2} \frac{\mu_{2k}+\mu_{2k-1}}{\lambda_{2k}+\mu_{2k}+\lambda_{2k-1}+\mu_{2k-1}} \exp\left(\frac{\lambda_{2k}}{\lambda_{2k}+\mu_{2k}} \cdot \frac{s_{2k}-s_{2k-1}}{\mu_{2k}}\right), \text{ if } s_{2k-1} < s_{2k}$$

(Similarity Calculation)

The above-mentioned calculations of $L_f$ are formulated as follows:

$$L_f = \prod_{k=1}^{s} L_k \tag{19}$$

Since $L_f$ generally has various correlations, it becomes a very large value when these correlations are multiplied. For this reason, $L_k$ is raised to the power 1/(kS), as indicated in the following equation, thereby suppressing the magnitude of the value:

$$L_f = \prod_{k=1}^{s} L_k^{\frac{1}{kS}} \tag{20}$$

This equation can be represented by a logarithmic likelihood as follows:

$$\log L_f = \sum_{k=1}^{S} \frac{1}{kS} \log L_k \tag{21}$$

If kS=1, this equation corresponds to calculation of a geometric mean of likelihoods of respective elements. This embodiment uses a logarithmic form, and kS is optimized depending on the case. In this example, kS takes a value of about 0.5 to 2.

(Details of Signal Detection Algorithm)

Figure 8:
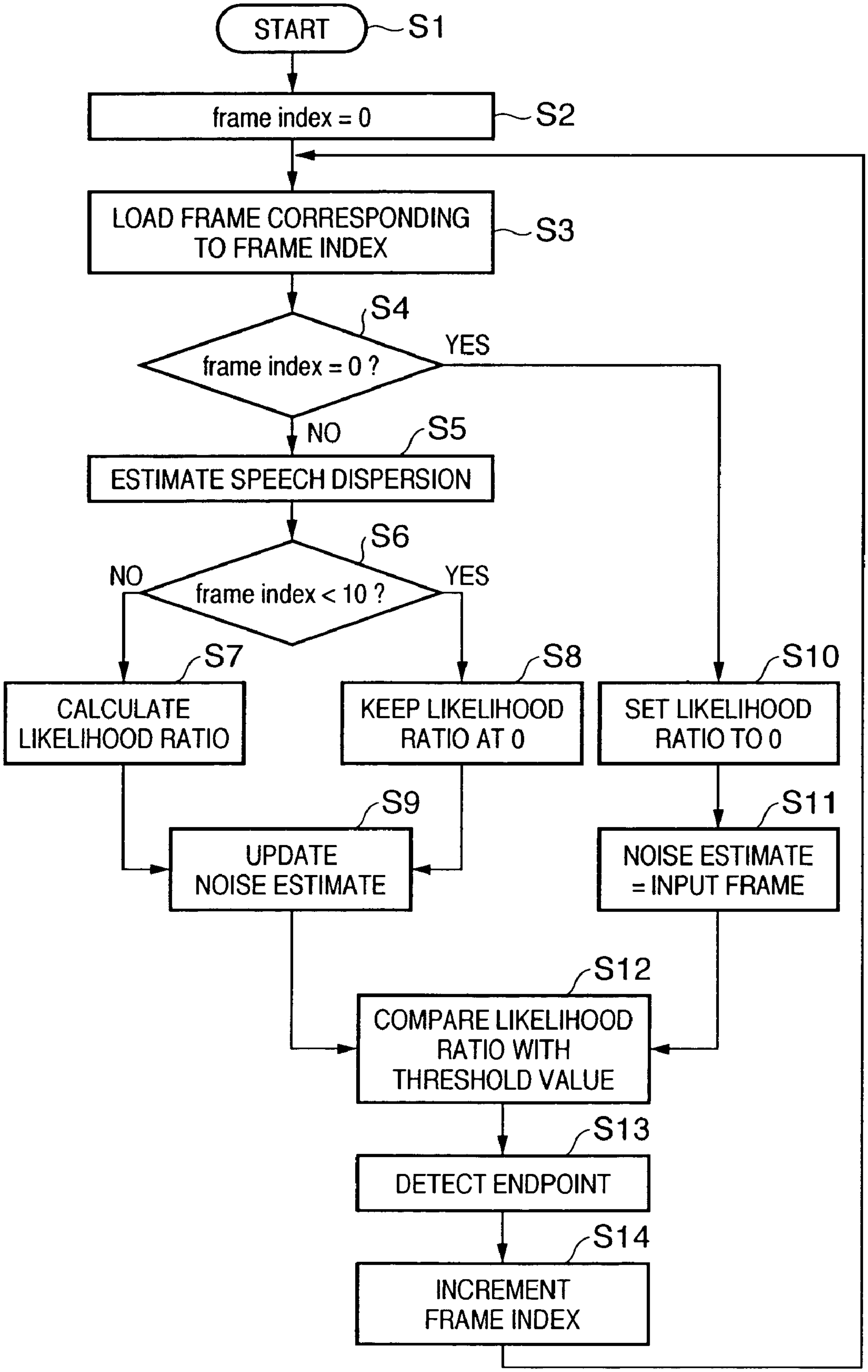
FIG. 8 is a flowchart showing the signal detection process according to the embodiment.

FIG. 8 is a flowchart showing the signal detection process according to this embodiment. A program corresponding to this flowchart is included in the VAD program stored in the HDD 4. The program is loaded onto the RAM 3 and is then executed by the CPU 1.

The process starts in step S1 as the initial step. In step S2, a frame index is set to 0. In step S3, a frame corresponding to the current frame index is loaded.

In step S4, it is determined whether the frame index is 0 (initial frame). If the frame index is 0, the flow advances to step S10 to set a likelihood ratio serving as a VAD metric to 0. Then, in step S11, the value of the initial frame is set to a noise estimate, and the flow advances to step S12.

On the other hand, if it is determined in step S4 that the frame index is not 0, the flow advances to step S5 to execute speech variance estimation in the above-mentioned manner. In step S6, it is determined whether the frame index is less than a predetermined value (e.g., 10). If the frame index is less than 10, the flow advances to step S8 to keep the likelihood ratio at 0. On the other hand, if the frame index is equal to or more than the predetermined value, the flow advances to step S7 to calculate the likelihood ratio serving as the VAD metric. In-step S9, noise estimation is updated using the likelihood ratio determined in step S7 or S8. With this process, noise estimation can be assumed to be a reliable value.

In step S12, the likelihood ratio is compared with a predetermined threshold value to generate binary data (value indicating speech or noise). If MAP is used, the threshold value is, e.g., 0; otherwise, e.g., 2.5.

In step S13, speech endpoint detection (to be described later) is executed on the basis of a result of the comparison in step S12 between the likelihood ratio and the threshold value.

In step S14, the frame index is incremented, and the flow returns to step S3. The process is repeated for the next frame.

According to the above-mentioned embodiment, a likelihood ratio is used as a VAD metric. This makes it possible to execute VAD immune to various types of background noises.

Above all, introduction of the maximum a-posteriori method (MAP) into calculation of a likelihood ratio facilitates adjustment of VAD for estimated SNR. This makes it possible to detect speech at high precision even if low-level speech is mixed with high-level noise.

The use of a differential feature ML method results in robustness against noise whose power is uniform over the full range of frequencies (including a rumble such as a footfall or sound that is hard to recognize such as one of a wind or breath).

Other Embodiments

The above-mentioned embodiment has described contents that pertain to speech such as speech recognition and the like. The present invention can also be applied to a signal of sound other than speech such as sound of a machine, animal, or the like. The present invention can be applied to acoustic information beyond the range of human hearing such as sonar, animal sound, or the like. Furthermore, the present invention can be applied to, e.g., an electromagnetic signal such as radar or radio signal.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user's computer.

Besides the cases where the aforementioned functions according to the embodiments are implemented by executing the read program by computer, an operating system or the like running on the computer may perform all or a part of the actual processing so that the functions of the foregoing embodiments can be, implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-418646 filed Dec. 16, 2003, which is hereby incorporated by reference herein.

What is claimed is:

1. A signal detection apparatus comprising:

first extraction means for extracting a feature amount of an input signal sequence;

second extraction means for extracting a feature amount of a noise component contained in the signal sequence;

first likelihood calculation means for calculating a first likelihood indicating probability that the signal sequence is detected, on the basis of a predetermined signal-to-noise ratio and the feature amount of the signal sequence extracted by said first extraction means;

second likelihood calculation means for calculating a second likelihood indicating probability that the noise component is detected, on the basis of the feature amount of the noise component extracted by said second extraction means;

likelihood comparison means for comparing the first likelihood with the second likelihood; and determination means for determining detection of the signal sequence on the basis of a comparison result obtained from said likelihood comparison means, wherein said likelihood comparison means compares the first likelihood with the second likelihood in accordance with:

$$L_f = \prod_{k=1}^{S} \frac{1}{e^{\omega}\gamma(0, \omega)\left(\frac{s_k^2}{\mu_k} + \omega\right)}\left[\exp\left(\frac{s_k^2}{\mu_k} + \omega\right) - 1\right]$$

where $L_f$ represents a likelihood ratio in a frame f, $s^2_k$ represents a kth element of a spectral power vector serving as the feature amount of the signal sequence extracted by said first extraction means in the frame f, $\mu_k$ represents a kth element of a noise estimation vector serving as the feature amount of the noise component extracted by said second extraction means in the frame f, S represents the number of vector elements, ω represents the signal-to-noise ratio, and γ represents a lower incomplete gamma function.

2. A signal detection apparatus comprising:

first extraction means for extracting a feature amount of an input signal sequence;

second extraction means for extracting a feature amount of a noise component contained in the signal sequence;

first likelihood calculation means for calculating a first likelihood indicating probability that the signal sequence is detected, on the basis of a predetermined signal-to-noise ratio and the feature amount of the signal sequence extracted by said first extraction means;

second likelihood calculation means for calculating a second likelihood indicating probability that the noise component is detected, on the basis of the feature amount of the noise component extracted by said second extraction means;

likelihood comparison means for comparing the first likelihood with the second likelihood; and determination means for determining detection of the signal sequence on the basis of a comparison result obtained from said likelihood comparison means, wherein said likelihood comparison means compares the first likelihood with the second likelihood in accordance with:

$$L_f = \prod_{k=1}^{S} \frac{1}{e^{\omega}\gamma(0, \omega)\left(\frac{s_k}{\mu_k} + \omega\right)}\left[\exp\left(\frac{s_k}{\mu_k} + \omega\right) - 1\right]$$

where $L_f$ represents a likelihood ratio in a frame f, $s_k$ represents a kth element of a spectral magnitude vector serving as the feature amount of the signal sequence extracted by said first extraction means in the frame f, $\mu_k$ represents a kth element of a noise estimation vector serving as the feature amount of the noise component extracted by said second extraction means in the frame f, S represents the number of vector elements, ω represents the signal-to-noise ratio, and γ represents a lower incomplete gamma function.

* * * * *